United States Patent [19]

Murphy

[11] Patent Number: 5,071,057
[45] Date of Patent: Dec. 10, 1991

[54] METHOD OF MAKING, AND WELDING FIXTURE FOR, WATER-STEAM COOLED CYCLONE ROOF ASSEMBLY

[75] Inventor: John Q. Murphy, Springwater, N.Y.

[73] Assignee: Foster Wheeler Energy Corporation, Clinton, N.J.

[21] Appl. No.: 590,196

[22] Filed: Sep. 28, 1990

[51] Int. Cl.5 .............................................. B23K 37/04
[52] U.S. Cl. .................................. 228/183; 228/49.1; 228/212; 228/213; 29/466; 29/467
[58] Field of Search .................... 228/49.1, 49.2, 49.3, 228/212, 213, 183, 184; 29/890.054, 468, 467, 466

[56] References Cited

U.S. PATENT DOCUMENTS

4,904,286 2/1990 Magol et al. ........................ 55/269

Primary Examiner—Kenneth J. Ramsey
Attorney, Agent, or Firm—Marvin A. Naigur

[57] ABSTRACT

Method and apparatus for making a roof of a water-steam cooled cyclonic separator. The fixture locates, supports, and restrains portions of the roof during welding operations. By continuing that restraint through a stress relief step, the method and apparatus address the problem of distortion that otherwise would occur during welding. The method and fixture provide good access to the roof during the welding operations and, in particular, allow for faster welding and welds of higher quality by maximizing the availability of "down hand" welding techniques. The fixture is a universal fixture, designed to accommodate roofs of varying geometries.

21 Claims, 6 Drawing Sheets

METHOD OF MAKING, AND WELDING FIXTURE FOR, WATER-STEAM COOLED CYCLONE ROOF ASSEMBLY

BACKGROUND OF THE INVENTION

The invention relates to a water-steam cooled cyclone separator and, more particularly, to the fabrication of a roof for such a cyclone separator, where the roof is to be fabricated separately from the remainder of the cyclone separator.

Water-steam cooled cyclone separators are known. An example is shown and described in U.S. Pat. No. 4,904,286 of Magol et al., the disclosure of which is incorporated by reference.

For ease of fabrication and shipping, it is desirable to fabricate the roof of the cyclone separator separate from the remainder of the cyclone separator. The roof alone may weigh between four and seven tons and have a diameter of fifteen to twenty feet. Despite its great size and weight, the roof must be fabricated to close tolerances so that the individual tubes of which it is composed can be mated on site to the barrel portion of the cyclone. Adding to the difficulty is that significant internal stresses are present that tend to warp the structure as it is being made. These stresses arise from the welding operations that occur in welding the tubes to the header of the cyclone and in welding fin material and the like to the tubes in order to form gas-tight surfaces. This effect even further adds to the difficulty of fabricating a cyclone roof.

SUMMARY OF THE INVENTION

It is therefore an object of the current invention to allow the economic assembly of parts of a massive roof unit to close tolerances.

It is a further object of the current invention to allow the construction of a welded cyclone roof and to maintain tolerances through the step of addressing the problem of distortion that otherwise would result from welding.

It is a still further object of the current invention to provide for the fabrication and delivery of a welded cyclone roof that can be transported and that will mate to a cyclone barrel after transportation.

It is still a further object of the current invention to provide a welding fixture and method of assembly of a cyclone roof to provide for trouble-free welding and welds of higher quality.

Toward the fulfillment of these and other objects, the current invention provides a method of fabricating a roof for a water-steam cooled cyclonic separator of the type having a water-wall formed of coolant conduits disposed below a header, the method achieving predetermined dimensional tolerance and comprising the steps of: providing a header member configured to form at least a portion of the header tank and having formed therein a plurality of coolant exit openings; providing a plurality of tubing members configured to cooperate with the header member to form a roof member of a water-cooled cyclonic separator; supporting the header member; supporting a plurality of the tubing members in fluid communication with respective ones of the coolant exit openings of the header member so as to create first ends of the coolant conduits; supporting a plurality of the tubing members with ends thereof disposed at the bottom of the roof member so as to form second ends of the coolant conduits; locating the second ends of the coolant conduits in fixed and predetermined locations with respect to the respective coolant exit openings of the header member and with respect to each other, said fixed and pre-determined locations being within pre-determined dimensional tolerance for the completed roof; restraining the second ends in said fixed and pre-determined locations; during said restraining, performing welding operations on the header member and the tubing members to form a roof member; and during said restraining, heating the roof member to a temperature and for a duration that are effective to achieve stress relief of the roof member.

Another aspect of the invention pertains to apparatus for making a roof for a water-steam cooled cyclonic separator of the type having a water-wall formed of coolant conduits disposed below a header tank, the apparatus comprising: a frame of a composition capable of withstanding the temperatures of a stress relief operation, the frame comprising a platform and means for supporting the platform above a floor, the platform being formed of members disposed substantially in a plane and having an extent at least sufficient to accommodate a roof member; header member support means fixed with respect to the frame for supporting a header member; tubing support means for supporting a plurality of tubing members in predetermined relation to the header member; and restraining means for positioning the ends of tubing members to predetermined dimensional tolerances and for effectively maintaining said predetermined dimensional tolerances through welding and stress relief operations.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accord with the present invention when taken in conjunction with the accompanying drawings wherein.

DESCRIPTION OF THE PREFERRED EMBODIMENTS

Figure 1:
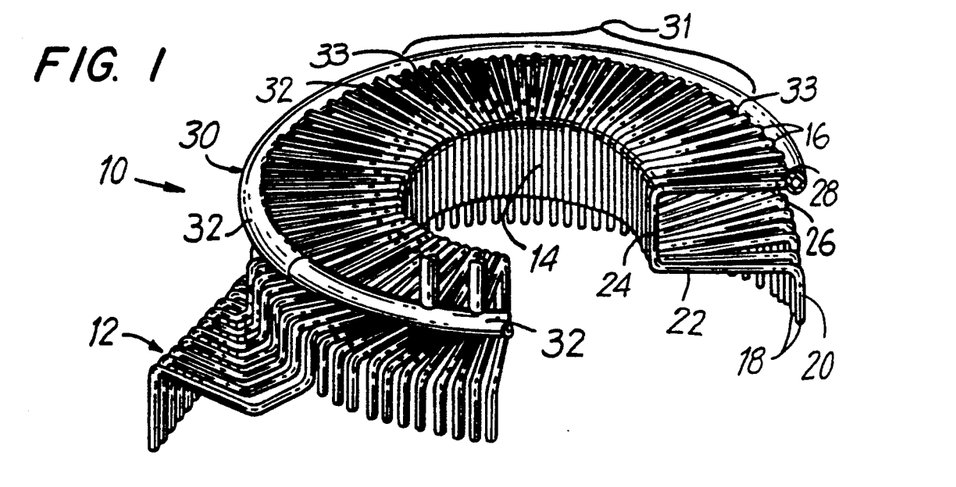
FIG. 1 is a partially broken-away perspective of a cyclone roof of a type that may be manufactured according to the current invention.

FIG. 1 is a partially broken-away perspective of a cyclone roof 10 of a type that may be made using the current invention. It is illustrative only, and many of the broad principles of the current invention may be used in making other forms of water-steam cooled cyclone roofs.

Water-steam cooled cyclones per se are known. Typically they include a cyclone entrance portion and an exit opening for separated gases. Accordingly, the roof 10 includes an entrance portion 12 and an exit opening 14 into which will be disposed a solid exit tube or other apparatus having a diameter substantially equivalent to the diameter of the exit opening 14.

Figure 7:
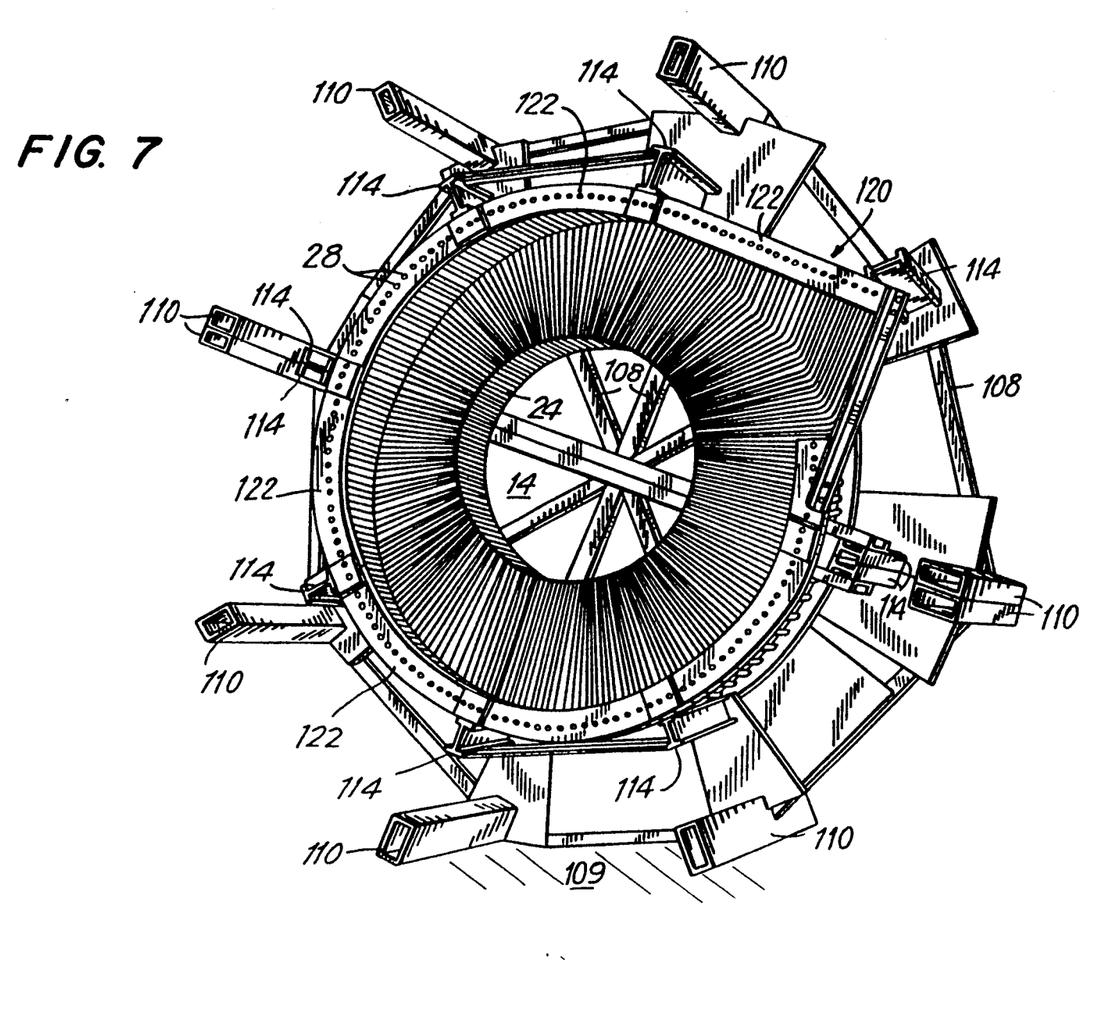
FIG. 7 is a perspective of a cyclone roof in a fixture according to the current invention, illustrating a further stage of fabrication.

The cyclone roof comprises a water-wall formed of a plurality of coolant conduits, preferably in the form of lengths of continuous tubing members 16 bent to the desired shape of the particular cyclone roof. In the illustrated embodiment, a typical tubing member 16 defines a lower end 18 which also is the lower end of its coolant conduit, a vertical run 20, a lower run 22, a knuckle 24, an upper run 26, and an upper end 28. Those tubing members 16 that define the cyclone entrance portion 12 have somewhat different shapes, as shown in FIGS. 1 and 7.

The upper end 28 of each tubing member 16 is in fluid communication with a header 30.

The roof as shown in FIG. 1 has been shipped to the site of its intended use in the form of four separate roof members 31, as suggested by the welds 33. It is an object of the current invention to provide for the fabrication of roof members 31 so as to provide for the best available fit of the roof members 31 when they arrive on site, both with other roof members 31 and with the underlying cyclone barrel assembly. For example, tolerance of the diameter of a fabricated roof has successfully been held to less than one-eighth inch.

The number of roof members 31 is a matter of choice and typically will depend on such factors as the size of the cyclone and shipping constraints. An alternative typical roof 10 might comprise six roof members 31, each extending through an arc of sixty degrees.

A completed roof member 31 typically will comprise a header member 32, a number of associated tubing members 16 welded to header member 32, a number of tension links 36 (FIG. 9) to be discussed later, fin material welded between the tubing members along the vertical runs 20 and lower runs 22 in order to form a gas-tight seal. Where needed some small bars or the like may be welded between the tubes along the knuckles 24, where the tubes are nearly tangent, and further, a non-gas-tight seal of optional design disposed along the upper runs 26, which is an area of the roof not exposed to combustion gases.

Figure 2:
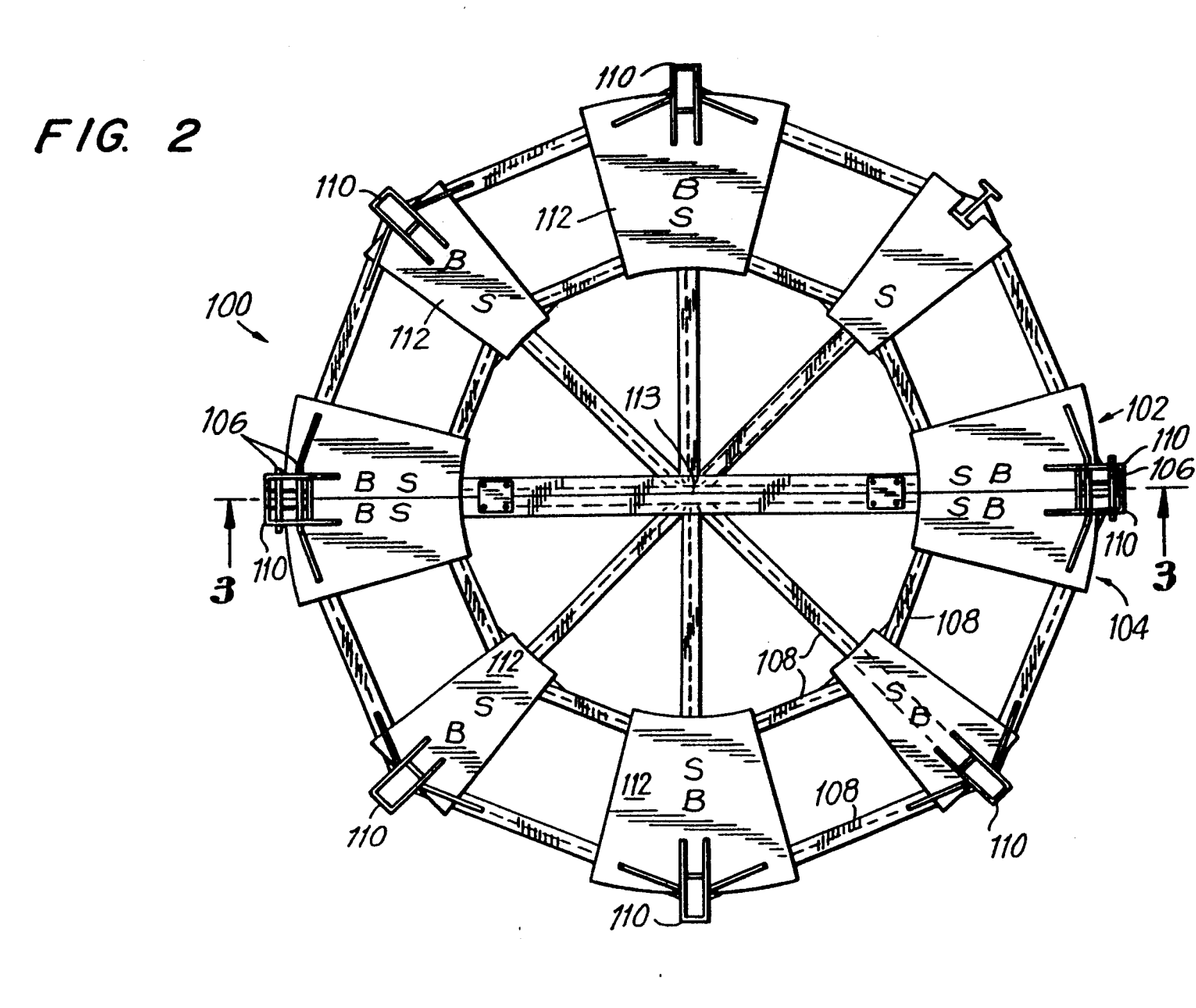
FIG. 2 is a top view of a universal welding fixture according to the current invention.

FIG. 2 is a top view of a universal fixture 100 according to the current invention. The fixture 100 comprises first frame 102 and second frame 104 held together along line 3—3 by removable bolts 106 or the like. Each frame 102, 104 comprises a platform made of platform members 108 and frame legs 110 (FIG. 3) for rigidly mounting the platform above a floor 109 or other work surface so that the various assembly operations may be carried out.

Each frame 102, 104 is made of a geometry and composition capable of withstanding the weight of the cyclone roof and the temperatures of a stress relief operation to be described later. In the illustrated embodiment, the platform members 108 are made of metallic I-beams.

In the illustrated embodiment, the fixture 100 is more than twenty-six feet across. It measures about ten feet from the floor to the top of the legs 110.

Figure 3:
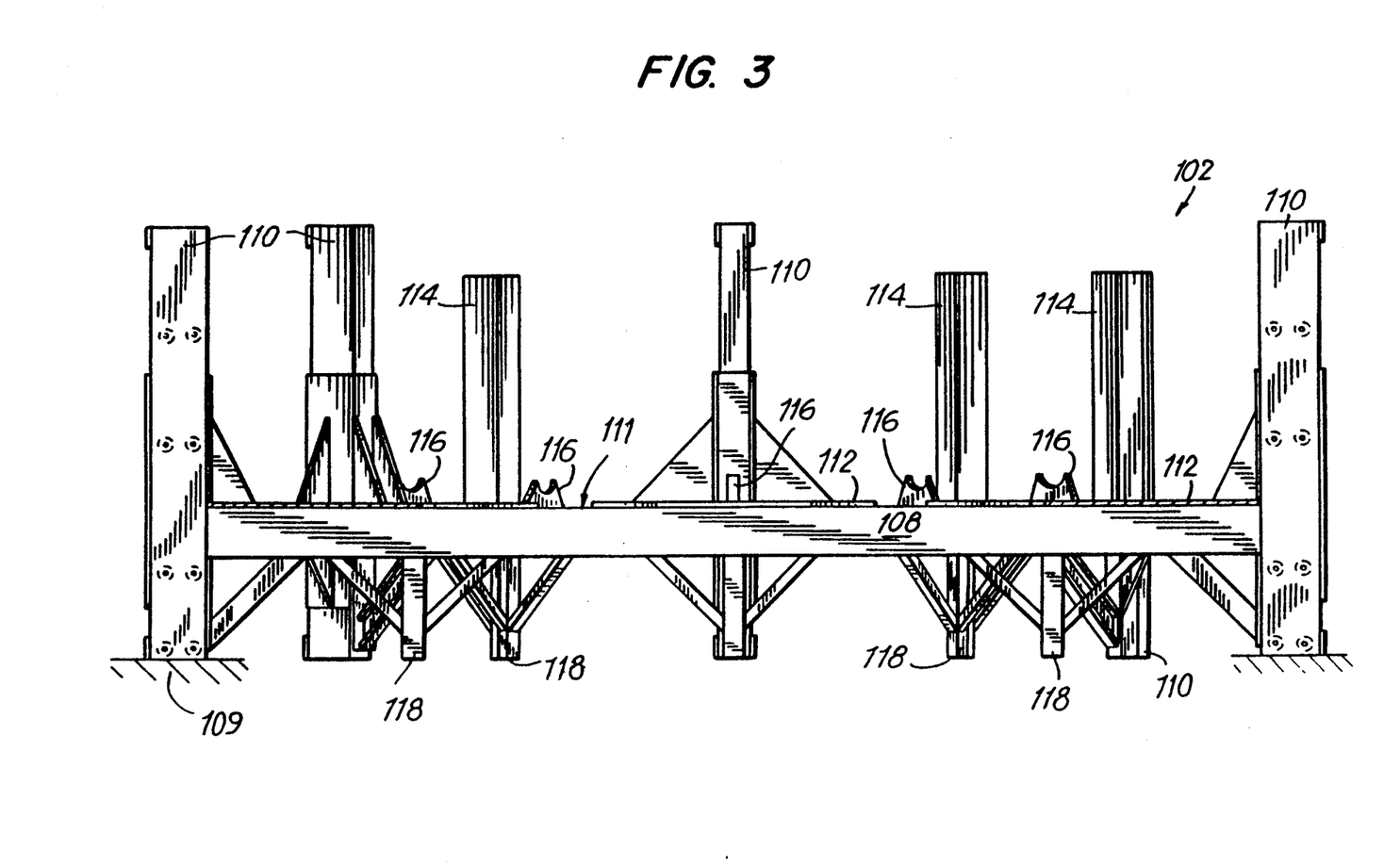
FIG. 3 is an elevation taken along line 3—3 of FIG. 2 with the addition of associated support hardware configured according to the individual cyclone roof being manufactured.

As seen in FIG. 3, the upper surfaces of the platform members 108 collectively define a platform reference surface 111 that serves as an initial reference point for the location of subsequently added hardware and roof members. The fixture as shown in elevation in FIG. 3 is in an intermediate stage of being modified for the construction of a specific cyclone roof by the addition of saddles 116 and adapter beams 114, in numbers and locations determined in accord with the particular cyclone roof to be constructed.

Referring back to FIG. 2, the future locations of the saddles 116 are indicated by the symbols "S," and the future locations of the adapter beams 114 are indicated by the symbols "B." Because the fixture 110 is a universal fixture, it is adapted to accommodate a variety of locations of the saddles and adapter beams.

In particular, a number of the platform members 108 extend radially from a line 113 (FIGS. 2 and 5) that will form the longitudinal center line of the cyclone roof. In this manner, they provide for location of the saddles 116 and adapter beams 114 at any radial distances. This means that cyclone roofs of any diameter may be manufactured.

Furthermore, a number of mounting plates 112 have been welded to the platform. These plates 112 may extend any desired distance laterally of the members 108. They serve further to increase the number of locations where the saddles 116 and adapter beams 114 may be mounted on the platform. In this way, the mounting plates 112 further increase the universality of the fixture 100.

The saddles 116 are welded to the frames and serve as means for supporting the header members in a predetermined and fixed relationship with respect to the frame. The current invention is not limited to saddles such as those illustrated. Any apparatus capable of performing the function would be acceptable.

Figure 8:
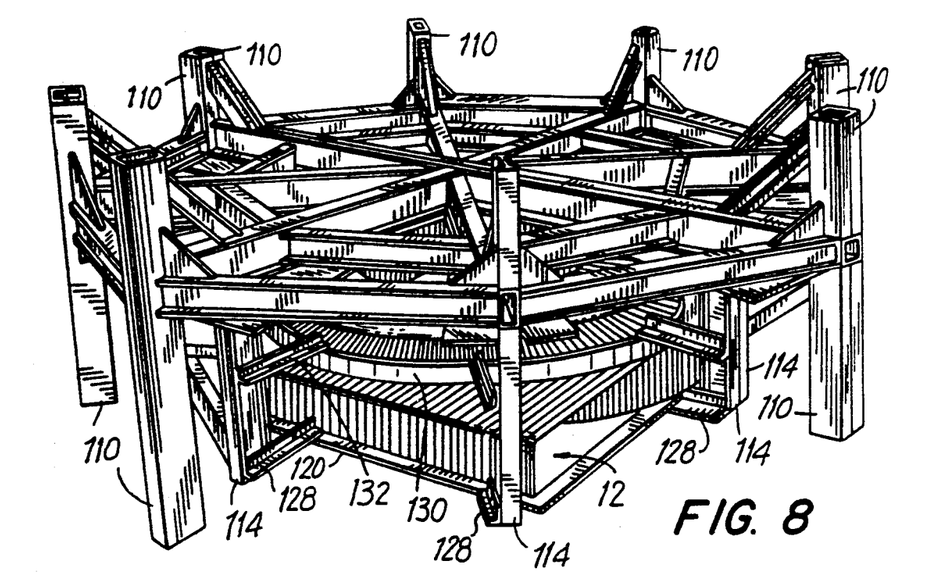
FIG. 8 is a perspective of the fixture and cyclone roof in a still further stage of fabrication.
Figure 9:
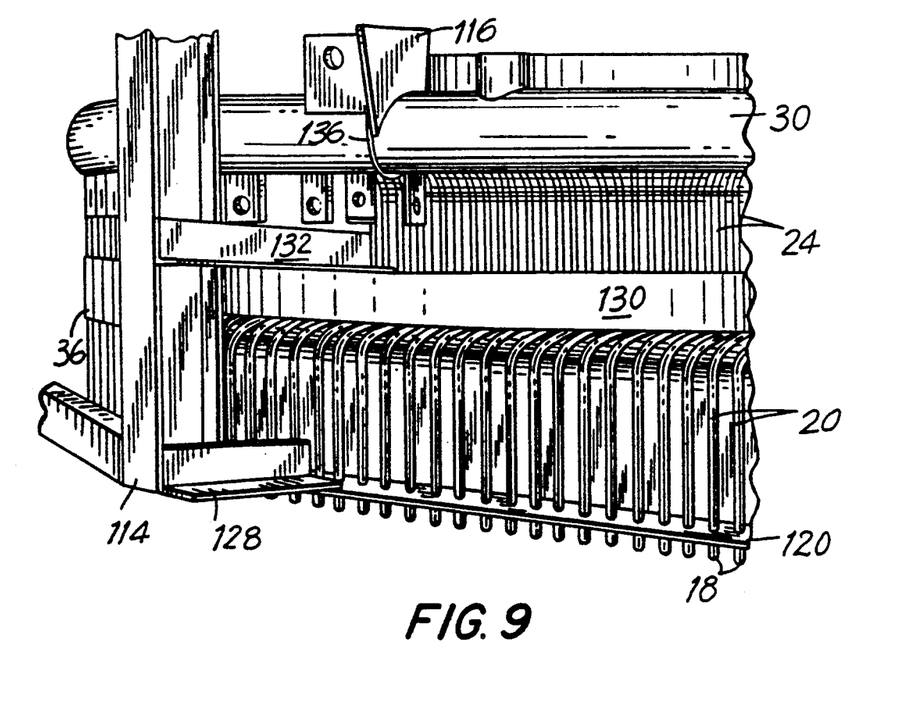
FIG. 9 is an enlargement of a portion of FIG. 8.

It may be seen from FIG. 3 that the heights of the adapter beams 114 above the platform reference surface 111 is not as great as the heights of the tops of the legs 110. Accordingly, when the fixture 100 is later inverted as shown in FIGS. 8 and 9 for purposes to be described below, the adapter beams 114 will not extend completely to the floor.

Figure 5:
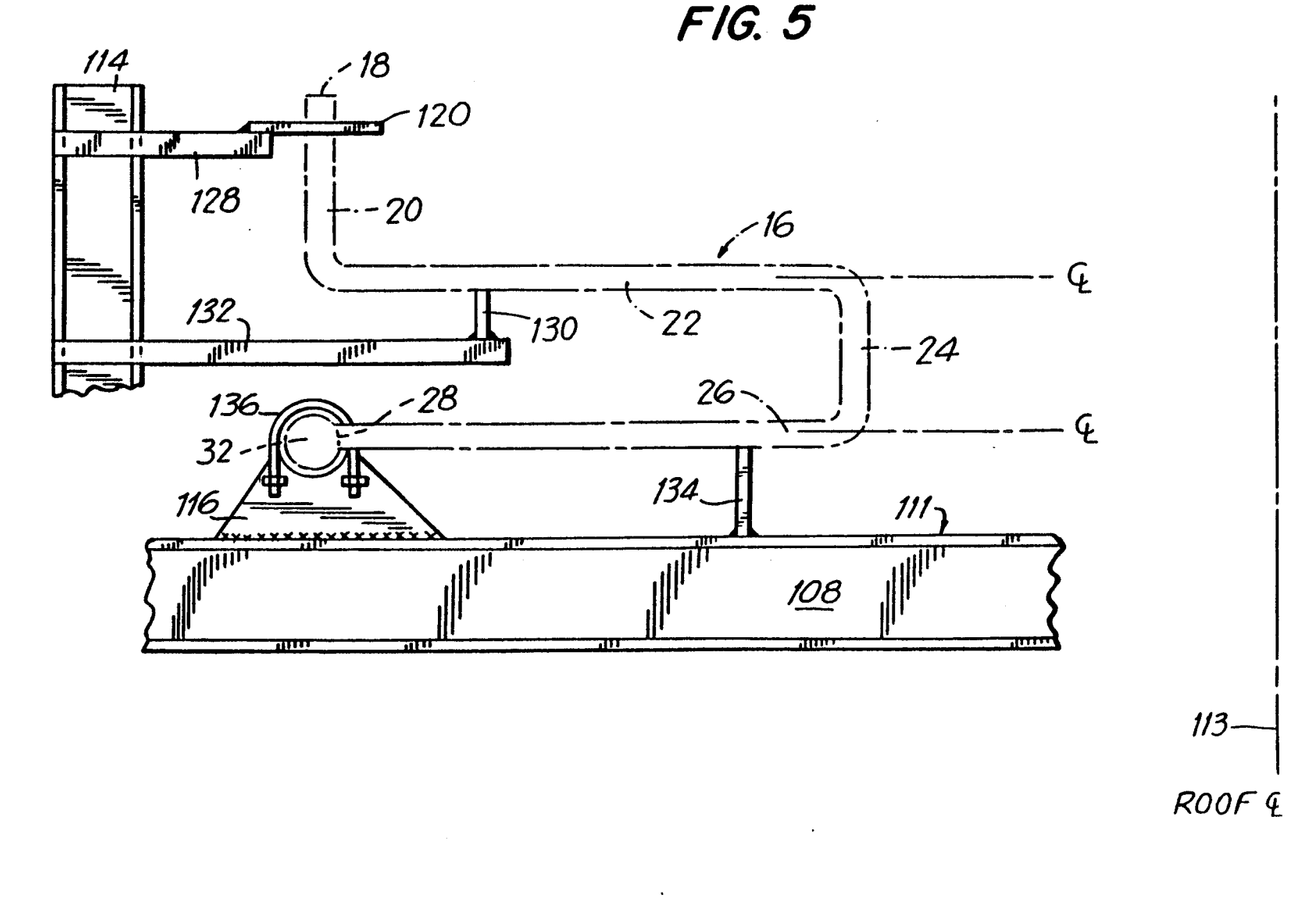
FIG. 5 is an enlargement of a portion of a fixture according to the current invention, also showing in phantom a portion of a roof member during a stage of fabrication according to the current invention.

FIG. 5 illustrates in phantom a header member 32 and a single tubing member 16 configured to cooperate with other tubing members 16 to form a roof member 31 Also shown in FIG. 5, in solid line, is certain additional hardware that is welded to the universal fixture in locations that are determined by the geometry of the particular roof member being constructed.

In particular, a lacing plate 120 is welded to a lacing plate support 128, one of which, in turn, is welded to each of the adapter beams 114. The lacing plate 120 is a template mounted in a fixed and pre-determined location with respect to the frame. It cooperates with the lower ends 18 of the tubing members in a manner to be described.

Figure 6:
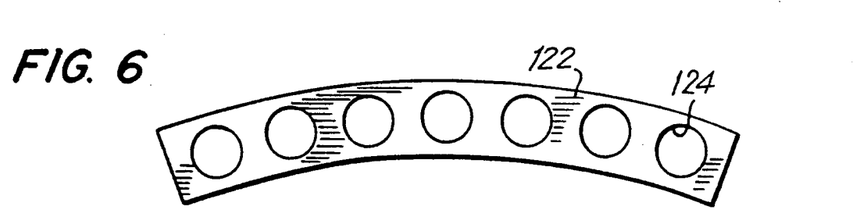
FIG. 6 is a plan view of a unit of a lacing plate.

In the illustrated embodiment, the template is essentially a metallic arc extending in a circumferential direction around the periphery of what will be the lower portion of the roof. FIG. 6 illustrates a single unit 122 of an embodiment of a lacing plate having holes 124 for individually receiving the lower ends 18 of the tubes 16. As shown in FIG. 7, a series of lacing plate units 122 are welded in place to define the entire lower portion of the cyclone roof.

Also shown in FIG. 5 is a lower run support ring 130 for the lower run 22. Lower run support ring 130 is seen in cross-section and is a metallic ring extending circumferentially of the roof member. The lower run support ring 130 is held in a fixed and pre-determined location by supports 132 welded to the adapter beams 114.

Not only does the lower run support ring 130 serve to provide general support to the tubing member 16, but more specifically it supports the center line of the lower run 22 at a fixed and pre-determined elevation above the reference surface 111. In a similar and analogous fashion, FIG. 5 shows an upper run support ring 134 that performs the same function for the upper run 26.

The support rings 130, 134 need not necessarily be arcuate or continuous. However, the illustrated structure is a convenient one. It might be possible to eliminate one or both of the support rings 130, 134, for example if a cyclone roof 10 having a different geometry were to be fabricated.

It may be seen from FIG. 5 that the supports 128, 132 may be welded to the adapter beams 114 at any elevation. Similarly, the lacing plate 120 and support rings 130, 134 may be disposed at substantially any appropriate radial distance from the roof center line. These capabilities further add to the universality of a fixture according to the current invention.

A method of making a water-steam cooled cyclone roof assembly according to the current invention will now be described.

The initial condition of the fixture 100 is such that the first frame 102 and second frame 104 are held together as shown in FIG. 2 and disposed in an upright configuration as shown in FIG. 3. The saddles 116 and adapter beams 114 are welded to the frames according to the geometry of the particular cyclone roof to be manufactured. In similar fashion the lacing plate 120 and support rings 130, 134 are welded in their appropriate locations according to the geometry of the particular roof to be manufactured, the elevations of the lacing plate 120 and lower run support ring 130 being determined by the locations at which their respective supports 128, 132 are welded to the adapter beams 114. The above-described operations establish known pre-determined dimensional relationships among the platform reference surface 111, saddles 116, lacing plate 120, and upper and lower run supports 130, 134.

Figure 4:
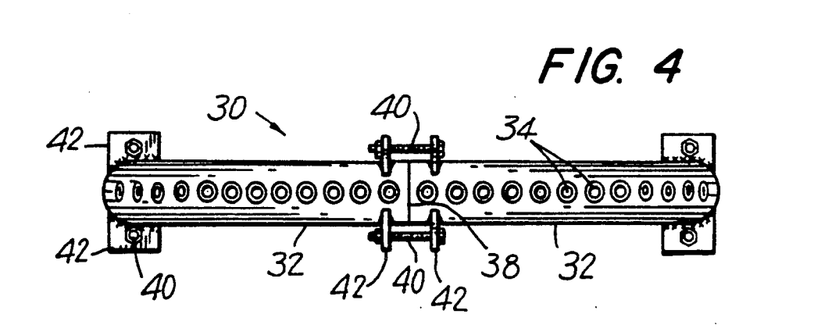
FIG. 4 is an elevation of a header of a cyclone roof illustrating a step in a method according to the current invention.

As shown in FIG. 4, a complete header 30 is assembled externally of the fixture 100 and temporarily held together along field joints 38. Any appropriate means may be used to hold together the header members 32. In the illustrated embodiment, field joint flanges 42 are welded to the header members 32 and joined by threaded tie rods 40.

Also visible in FIG. 4 are a plurality of coolant exit openings 34 to which the individual tubing members 16 will be welded. It is desirable for the openings 34 to be surrounded by recesses that are larger than the outside diameters of the tubes 16 in order to provide for effective tack welding and final welding, to be described below.

The header 30, temporarily held together by the tie rods 40 or the like, is placed in the saddles 116. The coolant exit openings 34 are carefully aligned with respect to the elements of the lacing plate 120. As best seen in FIG. 5, the header 30 is then secured in place by U-tie rods 136 or the like, which may be threadedly secured to the saddles 116 in a known manner.

Then, the individual tubes are installed by introducing their ends 18 individually to the lacing plate 120 and, as necessary, supporting their upper and lower runs on supports 130, 134. With the upper ends 28 of the tubes mounted to the coolant exit openings 34 of the header members 32, a tack weld is made to join each tube to its header member.

The above-described process defines what will be the lower portion of the cyclone roof and further serves to locate the tubes in fixed and pre-determined locations with respect to the coolant exit openings of the header member. In this manner, the geometry of the roof is established.

The lacing plate cooperates individually with each tube 16 to establish its location. Any apparatus capable of performing that function, and the restraint function to be described later, would be an acceptable substitute for the embodiment shown and described.

From the initial condition described above, the necessary welding operations to create a particular cyclone roof member may be carried out in any desired order and orientation. What follows is a description of the welding operations presently preferred in manufacturing a cyclone roof member of the type shown and described.

With the fixture 100 oriented in the upright configuration shown in FIGS. 3 and 5, and with the header members 32 and tubes 16 in-place and tack-welded to the header members, fin material and bars are installed and tacked, as needed, along the vertical run 20, lower run 22, and knuckle 24. This operation is carried out along surfaces that are facing either upwardly or oriented vertically with respect to FIG. 5. Accordingly, all welding may be accomplished in the "down hand" orientation, which allows for the highest quality welds to be produced and for the welding to proceed most quickly. The fixture affords good access to the various elements of the roofing member.

It is preferred for every other fin space to be welded initially, except for the knuckle. Then, a check for shrinkage may be made and certain welds may be broken and re-tacked as necessary. Adjoining tubes 16 disposed in locations corresponding to the header field joints 38 remain unwelded. The unwelded tubes define the opposite ends of the roof members 31.

Then, the fixture is attached to a crane or the like, for example by making shackle attachments to lifting lugs disposed on the tops of the legs and on the sides of the platform members 108. The fixture is tilted through ninety degrees so that the longitudinal axis 113 of the roof is correspondingly tilted by ninety degrees, and the fixture rests on the floor 109 along lengths of two of its legs as shown in FIG. 7. In this orientation, knuckle welding may occur from inside the cyclone exit opening 14. It is desirable to knuckle weld every other space, to re-set as necessary based on shrinkage, and then to weld the remaining knuckle spaces. Also in this orientation, the upper ends 28 of the tubes are completely welded to the header members 32.

It is desirable to perform these knuckle and header welding steps in the above-mentioned "down hand" orientation. Accordingly, the roof may be rotated about its longitudinal center line by successively resting the fixture 100 on various pairs of its legs. Again, the design of the fixture 100 provides for good access to the header members 32 in order to weld the tubes to them.

Finally, the fixture is moved to its inverted orientation as shown in FIGS. 8 and 9 for the final welding steps With the fixture inverted, the back sides of the fin material and tubes are disposed close to the floor, as shown, and may be welded quite easily in the "down hand" orientation. Also at this time, the above-mentioned tension links 36 may conveniently be welded between the header members 34 and the bends of the tubing where the vertical run 20 meets the lower run 22. At this stage a kinetically-formed plate or the like (not shown) may be welded to the upper runs 26 to form a non-gas-tight cover.

If desired, the above-described welding steps may be carried out in a different sequence However, during all of the welding steps, the fixture and its associated elements, notably including the saddles 116 and lacing plate 120, have kept the elements of the roof members 32 in place and, in particular, have restrained them from undergoing the warpage that otherwise would result from the stresses that arise during the welding operations. More particularly, the roof members are held to the desired final tolerances during the welding operations.

Figure 10:
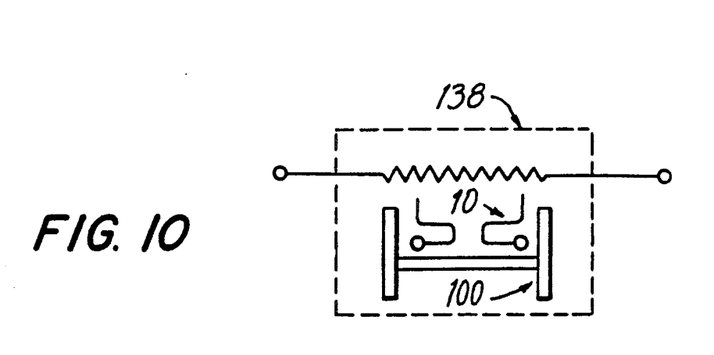
FIG. 10 is a schematic illustration of one half of the assembled cyclone is of and fixture in a heat treating furnace.

As a result of the above-described restraint, the roof members will be under internal stress following the welding operations. In order to relieve such stress, the fixture 100 is separated into its halves by the removal of bolts 106. Then, the first frame 102 and second frame 104 are sequentially introduced into an appropriate furnace 138 as illustrated schematically in FIG. 10. The roof members are heated to a temperature and for a duration necessary to accomplish the desired stress relief. By separating the fixture 100 into two halves, one is a able to accomplish the stress relief step by using a reasonably-sized existing furnace 138.

During the stress relief operation, the tubes 16 and header members 32 are again supported and restrained in the upright configuration as shown in FIG. 5 so that, upon cooling, the roof member is substantially stress-free and within the desired dimensional tolerance of the final product.

In order to protect the frames 102, 104 against themselves sagging during the stress relief operation, legs 118 (FIG. 3) may be added to support the platform members 108.

After the stress relief operation, the roof members 32 are complete. They may be removed from the first and second frames 102, 104 and mated to appropriate fixtures designed to support them during shipping and to accommodate the shipping mode selected.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A method of fabricating a roof for a water-steam cooled cyclonic separator of the type having a waterwall formed of coolant conduits disposed below a header, the method achieving predetermined dimensional tolerance and comprising the steps of:
   providing a header member configured to form at least a portion of the header tank and having formed therein a plurality of coolant exit openings;
   providing a plurality of tubing members configured to cooperate with the header member to form a roof member of a water-cooled cyclonic separator;
   supporting the header member;
   supporting a plurality of the tubing members in fluid communication with respective ones of the coolant exit openings of the header member so as to create first ends of the coolant conduits;
   supporting a plurality of the tubing members with ends thereof disposed at the bottom of the roof member so as to form second ends of the coolant conduits;
   locating the second ends of the coolant conduits in fixed and predetermined locations with respect to the respective coolant exit openings of the header member and with respect to each other, said fixed and predetermined locations being within predetermined dimensional tolerance for the completed roof;
   restraining the second ends in said fixed and predetermined locations;
   during said restraining, performing welding operations on the header member and the tubing members to form a roof member; and
   during said restraining, heating the roof member to a temperature and for a duration that are effective to achieve stress relief of the roof member.

2. The invention of claim 1, the cooling conduits predominantly being shaped as a "U", said supporting steps comprising the step of supporting a plurality of the tubing members at at least one location thereof remote from the first and second ends of the coolant conduits and such that the centerline of a leg of the "U" shape is held substantially horizontally at a predetermined level with respect to the coolant exit openings of the header member and within acceptable dimensional tolerance of the completed roof member.

3. The invention of claim 1, including the step of providing a lacing plate having means for cooperating individually with the second ends of the coolant conduits, the method including the steps of affixing the lacing plate in a configuration corresponding to the desired locations of the second ends, using the lacing plates to perform said step of supporting the tubing members so as to form second ends, and using the lacing plate to perform said locating and restraining steps.

4. The invention of claim 1, comprising the step of providing a fixture having a frame, supports for the header member, and supports for the tubing members, the method comprising the steps of using the fixture to conduct said supporting and restraining steps.

5. The invention of claim 4, comprising the steps of:
   affixing to the frame a means for supporting the header member;
   affixing to the frame a means for restraining the second ends of the coolant conduits;
   introducing the header member to its means for support; and
   adjusting the relative positions of the header member and the restraining means, as necessary, to achieve said fixed and predetermined locations.

6. The method of claim 4, comprising the steps of:
   carrying out the method using at least two header members;
   following said welding operations, separating the fixture into segments, each segment bearing a header member and its associated coolant conduits; and performing said heating step while the fixture is separated into said segments.

7. The invention of claim 4, said step of performing welding operations comprising the steps of performing a welding operation, displacing a longitudinal axis of the roof member by about ninety degrees, and performing a further welding operation.

8. The invention of claim 4, said step of performing welding operations comprising the steps of performing a welding operation, inverting the fixture, and performing a further welding operation.

9. The invention of claim 4, said step of performing welding operations comprising the steps of orienting a longitudinal axis of the roof member substantially horizontally, performing a welding operation, rotating the fixture about the longitudinal axis of the roof member, and performing a further welding operation.

10. Apparatus for making a roof for a water-steam cooled cyclonic separator of the type having a water-wall formed of coolant conduits disposed below a header tank, the apparatus comprising:
a frame of a composition capable of withstanding the temperatures of a stress relief operation, the frame comprising a platform and means for supporting the platform above a floor, the platform being formed of members disposed substantially in a plane and having an extent at least sufficient to accommodate a roof member;
header member support means fixed with respect to the frame for supporting a header member;
tubing support means for supporting a plurality of tubing members in predetermined relation to the header member; and
restraining means for positioning the ends of tubing members to predetermined dimensional tolerances and for effectively maintaining said predetermined dimensional tolerances through welding and stress relief operations.

11. The apparatus of claim 10, comprising means for supporting the platform in both upright and inverted substantially horizontal configurations.

12. The apparatus of claim 11, comprising means for retaining the header member in place when the platform is in the upright and inverted configurations.

13. The invention of claim 10, comprising
a plurality of separate frames;
respective header member support means, tubing support means, and restraining means fixed with respect to the frames; and
releasable means releasably joining the separate frames, wherein plural roof members intended for the same roof may be assembled in association and separated for subsequent treatment.

14. The invention of claim 10, the restraining means comprising a metallic template fixed with respect to the frame and having means for individually engaging ends of the tubing members.

15. The invention of claim 10, the tubing support means comprising a tubing support member fixed with respect to the frame and extending in a circumferential direction at a predetermined elevation with respect to the header member support means.

16. The invention of claim 10, comprising:
a plurality of legs extending from opposite faces of the platform and being means for supporting the platform in upright and inverted substantially horizontal configurations;
a plurality of adapter beams extending from one side of the platform substantially parallel to the legs; and
an arcuate template fixed to the adapter beams and extending in a circumferential direction, the arcuate template defining the bottom of a roof member.

17. The invention of claim 10, comprising:
a plurality of legs extending from opposite faces of the platform and being means for supporting the platform in upright and inverted substantially horizontal configurations;
a plurality of adapter beams extending from one side of the platform substantially parallel to the legs; and
tube support means fixed to the adapter beams at a predetermined elevation with respect to the header member support means and extending in a circumferential direction for supporting tubing members from beneath when the platform is in the upright configuration.

18. The invention of claim 10, the platform comprising plates extending transversely from the platform members, the header member support means being welded to the plates.

19. The invention of claim 10, the header member support means being welded to the platform members, and the platform members comprising a plurality of beams extending radially of the apparatus so that header member support means may be welded thereto over a continuum of radial locations.

20. The invention of claim 10, the tubing support means being welded to the adapter beams, the adapter beams having lengths to accommodate tubing support means mounted over a continuum of elevations.

21. The invention of claim 10, the restraining means being welded to the adapter beams, the adapter beams having lengths to accommodate restraining means mounted over a continuum of elevations.

* * * * *